(12) United States Patent
Kobayashi

(10) Patent No.: US 7,706,622 B2
(45) Date of Patent: Apr. 27, 2010

(54) IMAGE CODING APPARATUS AND IMAGE CODING METHOD

(75) Inventor: Satoru Kobayashi, Bunkyo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 11/286,723

(22) Filed: Nov. 23, 2005

(65) Prior Publication Data

US 2006/0115168 A1    Jun. 1, 2006

(30) Foreign Application Priority Data

Nov. 30, 2004    (JP) ............... 2004-345281

(51) Int. Cl.
G06K 9/36 (2006.01)
G06K 9/46 (2006.01)
G06K 9/40 (2006.01)
H04B 1/66 (2006.01)
H04N 11/02 (2006.01)
H04N 11/04 (2006.01)
H04N 7/12 (2006.01)

(52) U.S. Cl. ............... 382/239; 382/268; 382/250; 375/240.24

(58) Field of Classification Search ............... 382/268, 382/239, 250; 375/240.24
See application file for complete search history.

(56) References Cited

U.S. PATENT DOCUMENTS 5,021,891 A * 6/1991 Lee .................... 382/250
5,812,195 A * 9/1998 Zhang ................ 375/240.16
6,018,368 A * 1/2000 Kim et al. ........... 375/240.24
6,650,708 B1 * 11/2003 Ohgose .............. 375/240.16
6,801,250 B1 * 10/2004 Miyashita ........... 348/220.1

(Continued)

FOREIGN PATENT DOCUMENTS

EP    1322121 A2 *    6/2003

(Continued)

OTHER PUBLICATIONS

Gordon et al., "Simplified of 8×8 Transforms—Results", Joint Video Team (JVT) of ISO/IEC MPEG & ITU-T VCEG 10th meeting: Waikoloa, Hawaii, USA, Document: JVT-J030, Dec. 8-12, 2003. (downloaded on Jul. 28, 2009 from http://wftp3.itu.int/av-arch/jvt-site/2003_12_Waikoloa/JVT-J030.doc).*

(Continued)

*Primary Examiner*—Samir A Ahmed
*Assistant Examiner*—Li Liu
(74) *Attorney, Agent, or Firm*—Canon U.S.A. Inc., I.P. Division

(57) ABSTRACT

There is provided an image coding apparatus including a mode selection unit arranged to select an input image type, an input unit arranged to input image data in accordance with an output of the mode selection unit, an image size determination unit arranged to determine an image size of the image data input by the input unit, a block size determination unit arranged to determine a block size of a block in accordance with the image size determined by the image size determination unit; and a block construction unit arranged to divide the image data input by the input unit into blocks of the block size determined by the block size determination unit.

28 Claims, 15 Drawing Sheets

U.S. PATENT DOCUMENTS

| | | | |
|---|---|---|---|
| 2002/0034316 A1* | 3/2002 | Ishii et al. | 382/104 |
| 2003/0112870 A1 | 6/2003 | Fukuda et al. | |
| 2004/0061797 A1* | 4/2004 | Takahashi et al. | 348/333.01 |
| 2004/0085460 A1* | 5/2004 | Shiomi | 348/231.3 |
| 2004/0090539 A1* | 5/2004 | Kim et al. | 348/231.1 |
| 2004/0096111 A1* | 5/2004 | Thyagarajan | 382/239 |
| 2005/0094884 A1* | 5/2005 | Takishima et al. | 382/243 |
| 2005/0129125 A1* | 6/2005 | Cha et al. | 375/240.16 |
| 2005/0238099 A1 | 10/2005 | Veltman | |

FOREIGN PATENT DOCUMENTS

| | | | |
|---|---|---|---|
| EP | 1418763 A1 * | 5/2004 | |
| JP | 05-207440 A | 8/1993 | |
| JP | 07-14383 A | 6/1995 | |
| JP | 2002-314870 A | 10/2002 | |
| JP | 2003-250161 A | 9/2003 | |
| JP | 2003-319394 A | 11/2003 | |
| JP | 2004-056827 A | 2/2004 | |

OTHER PUBLICATIONS

Tao Chen Jiuhuai Lu Kashiwagi, Y. Nishi, T. Kadono, S. "Technologies in MPEG-4 AVC FRExt for improving subjective picture quality in high-definition video compression", International Conference on Consumer Electronics, 2005. ICCE. 2005 Digest of Technical Papers. Jan. 8-12, 2005, pp. 225-226.*

* cited by examiner

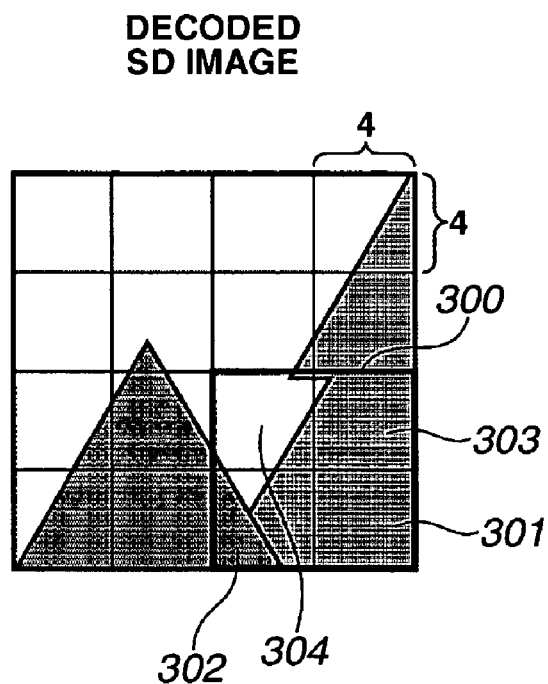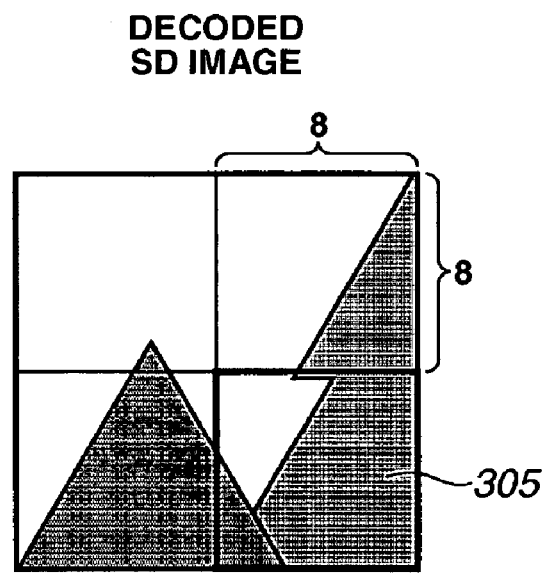
FIG.3A DECODED SD IMAGE
FIG.3B DECODED SD IMAGE

DECODED SD IMAGE

501

DECODED HD IMAGE

502

FIG.10A 8×8 PIXEL BLOCK
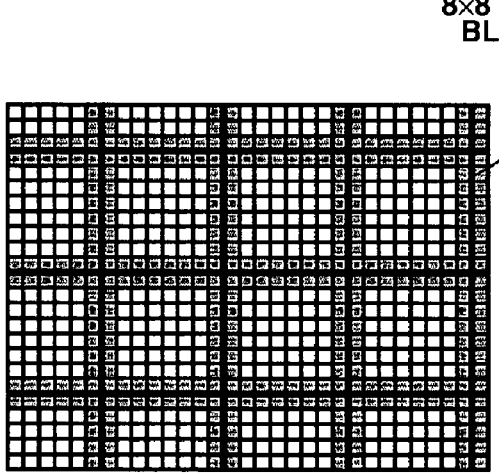
FIG.10B 4×4 PIXEL BLOCK
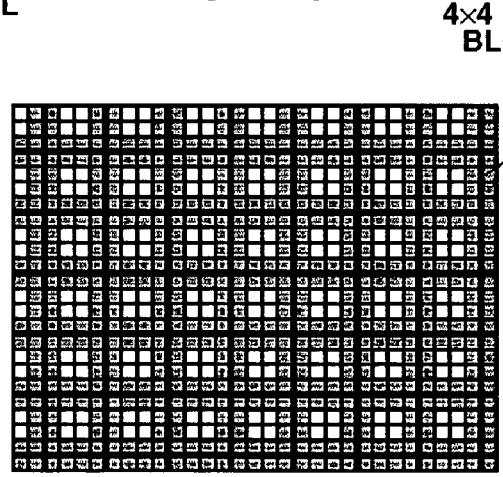

IMAGE CODING APPARATUS AND IMAGE CODING METHOD

BACKGROUND OF THE INVENTION

1. Field of the Invention

The present invention relates to an image coding apparatus and a method thereof, and in particular, in the image coding apparatus and the method thereof for performing coding process by a block unit, relates to a technology for performing coding process corresponding to a plurality of input image sizes.

2. Description of the Related Art

AS a technology for high efficiency coding a moving image, coding methods, such as Motion JPEG (Joint Photographic Experts Group) and MPEG (Moving Picture Experts Group)-1 and MPEG-2, become commercially practical. Each manufacturer is developing and commercially producing DVD (digital versatile disk) recorders or imaging apparatuses such as digital video cameras, which make the video data recordable by using the coding methods. A user can simply view and listen to the moving image using these apparatuses or personal computers, DVD players, etc.

Also, the method using JPEG as the technology which performs compression coding of the still image is in use. A digital still camera compresses a picked-up image using JPEG, and records the compressed image in a memory card etc.

Furthermore, a coding method of the moving image which can produce further high compression rather than the above-described MPEG-2 etc. is desired. Recently, a coding method called H.264/MPEG-4 part 10 (hereinafter, referred to as "H.264") has been standardized by ITU-T (International Telecommunication Union—Telecommunication Standardization Sector) and ISO (International Organization for Standardization). Although, H.264 requires many operation amounts of coding and decoding rather than the conventional coding methods, it is known that higher coding efficiency is realized. The arrangement of data processing of H.264 is disclosed in Japanese Patent Laid-Open No. 2004-56827, for example. Generally, the digital still camera can select a pixel number, such as 640×480 pixels, 1600×1200 pixels, etc. and record the picked-up still image with the selected pixel number. In the digital video camera, there are products which can select a video format, such as 480/60i, 720/30p, 1080/60i (i: interlace mode, p: progressive mode) and record the picked-up moving image with the selected video format. An imaging apparatus which performs recording processing of several input image signals with which the pixel numbers are different is disclosed in Japanese Patent Laid-open No. 2002-314870, for example.

Thus, the types and sizes of the images which are input and recorded in the imaging apparatus can consider various cases.

However, for example, in cases where the imaging apparatus adopts the H.264 coding method, the following problems exist.

Since a block size in an integer transform performed at the time of a coding process of H.264 is fixed to a 4×4 pixel block, there is a problem that flexibility is lacking when it corresponds to a variety of input images handled with the imaging apparatus.

Furthermore, regarding the above-described integer transform, in a case where an orthogonal transform is performed by the 4×4 pixel block for the input image is compared with the case where an orthogonal transform is performed by an 8×8 pixel block for the same input image, the orthogonal transform by the 4×4 pixel block has a degradation, for a decoded image of a complicated pattern, rather than the orthogonal transform by the 8×8 pixel block. This is because special frequency resolution of the orthogonal transform by the 4×4 pixel block is lower than the orthogonal transform by the 8×8 pixel block.

SUMMARY OF THE INVENTION

In view of the above problems in the conventional art, the present invention provides an image coding apparatus and a method, by MPEG, H.264, or an image method to which the above-described coding technology is made to inherit or extend, which can obtain a high quality decoded image in the image of the complicated pattern.

In accordance with an aspect of the present invention, an image coding apparatus for performing a coding process by a block unit, includes: a mode selection unit arranged to select an input image type; an input unit arranged to input image data in accordance with an output of the mode selection unit; an image size determination unit arranged to determine an image size of the image data input by the input unit; a block size determination unit arranged to determine a block size of a block in accordance with the image size determined by the image size determination unit; and a block construction unit arranged to divide the image data input by the input unit into blocks of the block size determined by the block size determination unit.

In accordance with another aspect of the present invention, an image coding apparatus for performing a coding process by a block unit, includes: an input unit arranged to input image data; an image size determination unit arranged to determine an image size of the image data input by input unit; a block size determination unit arranged to determine a block size of the block in accordance with the image size determined by the image size determination unit; a block construction unit arranged to divide the image data input by the input unit into blocks of the block size determined by the block size determination unit; and a filter arranged to perform a filtering process for the image data by the block size determined by the block size determination unit.

In accordance with another aspect of the present invention, an image coding apparatus for performing a coding process by a block unit, includes: an input unit arranged to selectively input standard definition image data and high definition image data; an image size determination unit arranged to determine whether the image data input by the input unit is standard definition image data or high definition image data; a block size determination unit arranged to determine a block size according to an output of the image size determination unit; a block construction unit arranged to divide the image data input by the input unit into blocks in accordance with the block size determined by the block size determination unit; an orthogonal transform unit arranged to transform the image data for the every block divided by the block construction unit; a quantization unit arranged to quantize the image data transformed by the orthogonal transform unit; a coding unit arranged to encode the image data quantized by the quantization unit; and a deblocking filter arranged to perform a filtering process for the image data in accordance with the block size.

Further features and advantages of the present invention will become apparent from the following description of exemplary embodiments (with reference to the attached drawings).

BRIEF DESCRIPTION OF THE DRAWINGS

FIG. 3A illustrates a decoded image, by a 4×4 pixel block, corresponding to a block of the SD original image of FIG. 2.

FIG. 3B illustrates a decoded image, by an 8×8 pixel block, corresponding to a block of the SD original image of FIG. 2.

FIG. 10A illustrates pixel values by which the deblocking filter is performed for the 8×8 pixel block.

FIG. 10B illustrates pixel values by which the deblocking filter is performed for the 4×4 pixel block.

DESCRIPTION OF THE EMBODIMENTS

Exemplary embodiments of the invention are described in detail below with reference to the accompanying drawings. The relative layout of constituent elements exemplified in the embodiments should appropriately be changed in accordance with the arrangement and conditions of the apparatus to which the present invention is applied. The present invention is not limited to these illustrative embodiments.

First Embodiment

Figure 1:
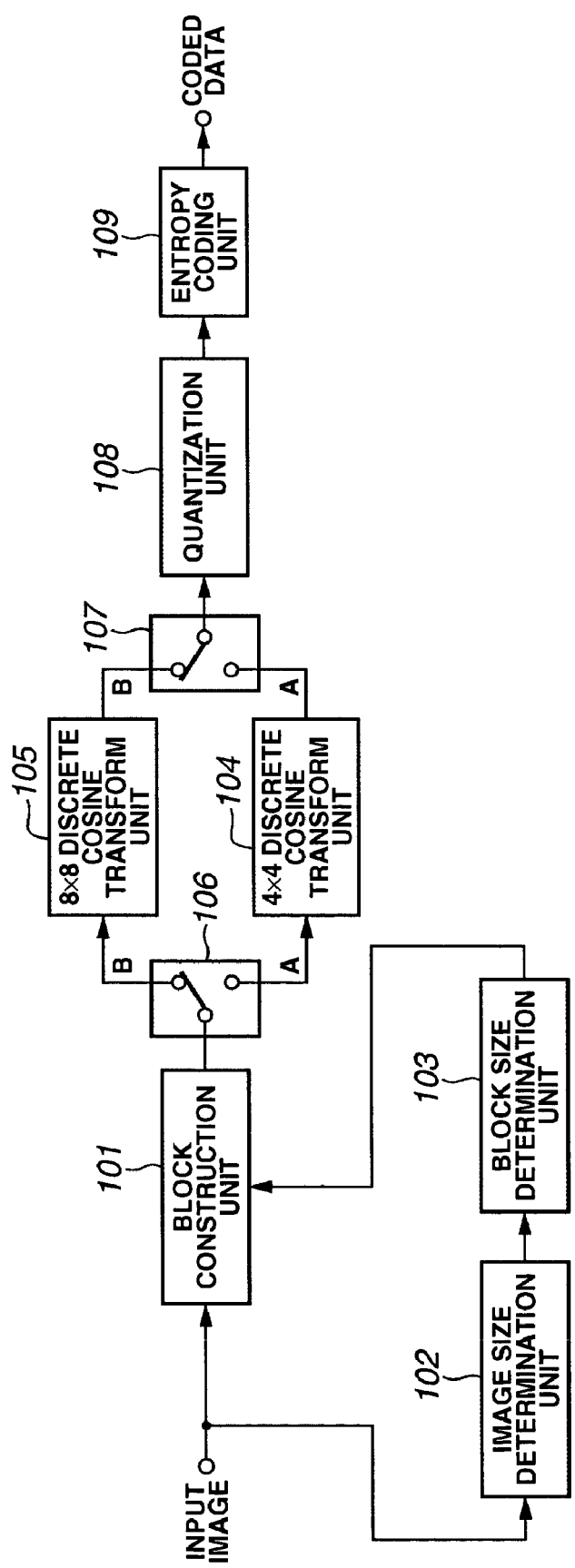
FIG. 1 is an exemplary block diagram of an image coding apparatus in a first embodiment of the present invention.

FIG. 1 is a block diagram of the image coding apparatus, which is suitably used in the imaging apparatus etc., in the first embodiment of the present invention. Since the imaging apparatus includes a camera in cases where the image coding apparatus in this embodiment is applied to the imaging apparatus, the image data picked-up by the camera is equivalent to the input image data in the image coding apparatus of this embodiment.

In FIG. 1, a block construction unit 101 divides the input image data into the blocks of a predetermined size. An image size determination unit 102 determines an image size of the input image input into the block construction unit 101. A block size determination unit 103 determines a block size formed in the block construction unit 101 according to the image size determined by the image size determination unit 102.

A 4×4 discrete cosine transform unit 104 performs the discrete cosine transform for a 4×4 pixel block. An 8×8 discrete cosine transform unit 105 performs the discrete cosine transform for an 8×8 pixel block. Selection units 106 and 107 select one of the 4×4 discrete cosine transform unit 104 (a path by the side of "A" in the selection units 106 and 107) and the 8×8 discrete cosine transform unit 105 (a path by the side of "B" in the selection units 106 and 107) according to the block size determined by the block size determination unit 103.

A quantization unit 108 quantizes transform coefficients output by the 4×4 discrete cosine transform unit 104 or the 8×8 discrete cosine transform unit 105. An entropy coding unit 109 entropy-encodes the quantized transform coefficients by the quantization unit 108 and outputs coded data.

The above-described discrete cosine transform is described in detail below.

The discrete cosine transform is an orthogonal transform and is a transform method used in MPEG-1 and MPEG-2, etc. (the MPEG is fixed to the 8×8 pixel block).

Figure 14:
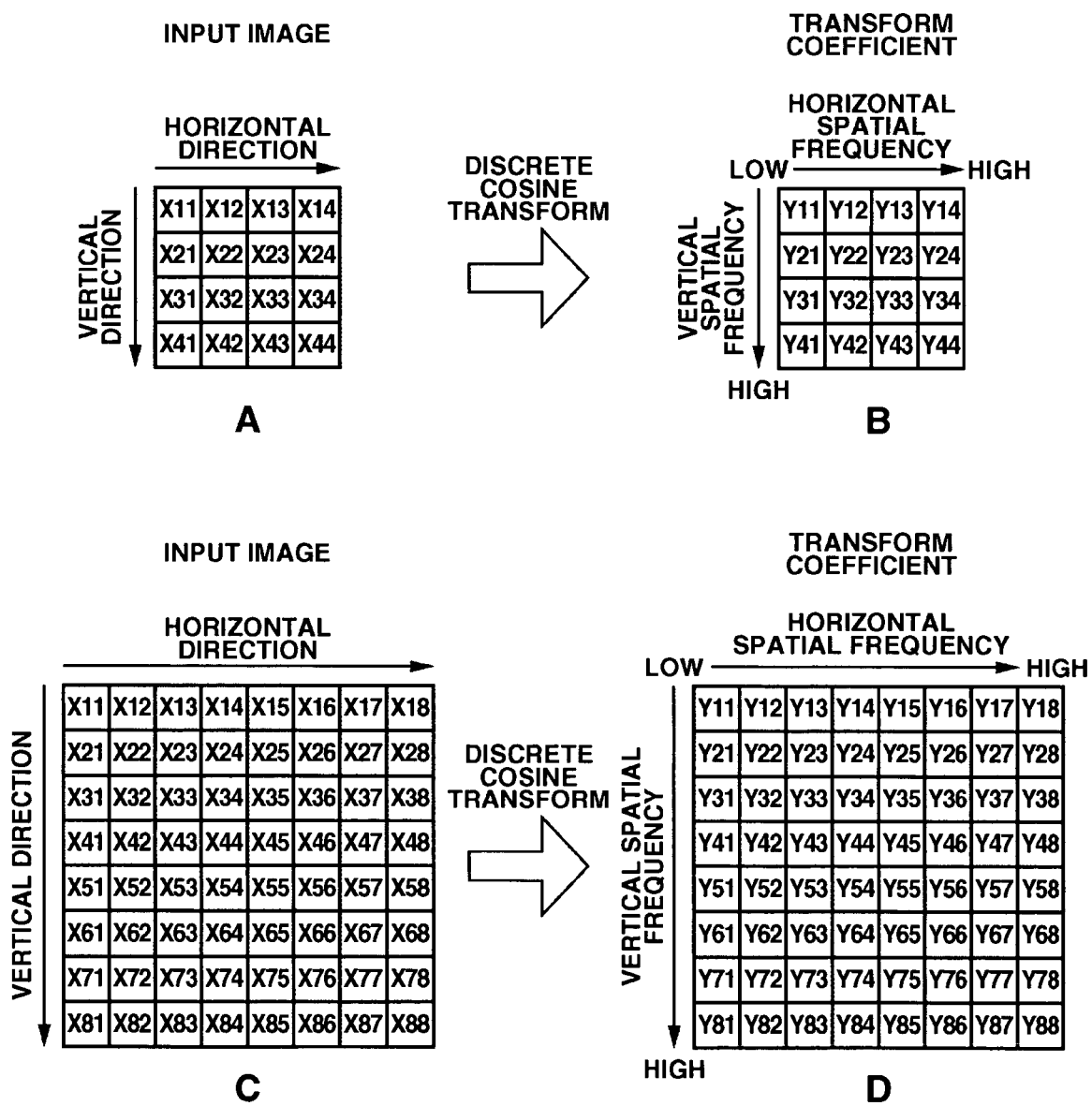
FIGS. 14A, 14B, 14C and 14D illustrate a process of a discrete cosine transform.

The discrete cosine transform is described below with reference to FIG. 14. FIG. 14A illustrates the input image of the 4×4 pixel block, and FIG. 14B illustrates the transform coefficients output after performing the discrete cosine transform for the 4×4 pixel block. Also, FIG. 14C illustrates the input image of the 8×8 pixel block, and FIG. 14D illustrates the transform coefficients output after performing the discrete cosine transform for the 8×8 pixel block.

The example which performed the discrete cosine transform for the 4×4 pixel block is described with reference to FIG. 14A and FIG. 14B. $X_{11}$ to $X_{44}$ indicates the pixel values of the input image, and $Y_{11}$ to $Y_{44}$ indicates the discrete cosine transform coefficients. Here, $A_4$ indicates a 4×4 discrete cosine transform matrix, X indicates the input image data, and Y indicates data of the discrete cosine transform coefficient. The discrete cosine transform is defined by the following equation:

$$[Y] = [A_4] \quad [X] \quad [A_4]^T \quad (1)$$

where $$A_4 = \begin{bmatrix} a & a & a & a \\ b & c & -c & -b \\ a & -a & -a & a \\ c & -b & b & -c \end{bmatrix} \quad (2)$$

$$a = \frac{1}{2}, b = \sqrt{\frac{1}{2}} \cos\left(\frac{\pi}{8}\right), c = \sqrt{\frac{1}{2}} \cos\left(\frac{3\pi}{8}\right)$$

$$X = \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \quad (3)$$

$$Y = \begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} \quad (4)$$

That is, the equation (1) can be rewritten by the following equation:

$$\begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} = \begin{bmatrix} a & a & a & a \\ b & c & -c & -b \\ a & -a & -a & a \\ c & -b & b & -c \end{bmatrix} \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \quad (5)$$

$$\begin{bmatrix} a & b & a & c \\ a & c & -a & -b \\ a & -c & -a & b \\ a & -b & a & -c \end{bmatrix}$$

Therefore, in the equation (5) and FIG. 14B, a vertical spatial frequency turns into a high transform coefficient in the order of $Y_{11}$, $Y_{21}$, $Y_{31}$, and $Y_{41}$, and a horizontal spatial frequency turns into a high transform coefficient in the order of $Y_{11}$, $Y_{12}$, $Y_{13}$, and $Y_{14}$. That is, the matrices are arranged left to right and top to bottom in order of increasing frequencies.

In cases where the 8×8 pixel block is converted as shown in FIG. 14C and FIG. 14D, since there are many transform coefficients compared with the case of the 4×4 pixel block, it can be said that the spatial frequency resolution is high. In the transform coefficients of the equation (5), the $Y_{11}$ is a DC component of the input image, and the discrete cosine transform coefficients with which the $Y_{12}$ to the $Y_{44}$ other than the $Y_{11}$ indicate the AC components of the input image.

Operation of the image coding apparatus of FIG. 1 is described below. The image coding apparatus in this embodiment can adaptively change the size of the block, which is a coding unit according to the image size of the input image and perform coding process by using the block. Then, the image coding apparatus can be selected from the 4×4 pixel block and the 8×8 pixel block.

Also, as the input image, a high definition image of the 1920×1080 pixels (referred to herein as "HD image") and a standard definition image of the 720×480 pixels (referred to herein as "SD image") are made into an example, and this embodiment is described. The image coding apparatus of this embodiment is not limited to the above-described image sizes, and can be corresponded with an image size (e.g., 360×288 pixels (CIF (Common Intermediate Format) image), 360×240 pixels (SIF (Source Input Format) image), etc.) other than the HD and SD images. Also, the image coding apparatus can be corresponded with the block size (e.g., a 4×8 pixel block, a 2×4 pixel block, etc.) other than the 4×4 and 8×8 pixel blocks. Additionally, in this embodiment, another orthogonal transform (e.g., the integer transform, a Hadamard transform, etc.) may be used instead of the discrete cosine transform.

In FIG. 1, first, when the image data is input, the image size of the input image data is determined by the image size determination unit 102. In this embodiment, it is determined which of the SD image and HD image is the input image data. In cases where the input image is determined to be the SD image by the image size determination unit 102, the block size determination unit 103 determines the block size as the 4×4 pixels. Otherwise, in cases where the input image is determined to be the HD image by the image size determination unit 102, the block size determination unit 103 determines the block size as the 8×8 pixels. The block construction unit 101 divides the input image data into the blocks according to the block size determined by the block size determination unit 103. The block construction unit 101 divides the input image data into the blocks according to the block size determined by the block size determination unit 103.

The selection units 106 and 107 select "A" of FIG. 1, in cases where the block size determined by the block size determination unit 103 is the 4×4 pixels. That is, the processing in the 4×4 discrete cosine transform unit 104 is selected. Otherwise, the selection units 106 and 107 select "B" of FIG. 1, in cases where the block size determined by the block size determination unit 103 is the 8×8 pixels. That is, the processing in the 8×8 discrete cosine transform unit 105 is selected. The selected 4×4 discrete cosine transform unit 104 or 8×8 discrete cosine transform unit 105 performs the discrete cosine transform for the block and outputs the discrete cosine transform coefficients to the quantization unit 108. The quantization unit 108 quantizes the input discrete cosine transform coefficients. Then, the entropy coding unit 109 entropy-encodes the quantized discrete cosine transform coefficient and outputs the coded data.

The effect which the block size exerts on the compressed image is described below.

The block size exerts an effect on a generation of a block distortion and the spatial frequency resolution. First, the generation state of block distortion is described with reference to the original image of FIG. 2, and the decoded image of FIG. 3.

Figure 2:
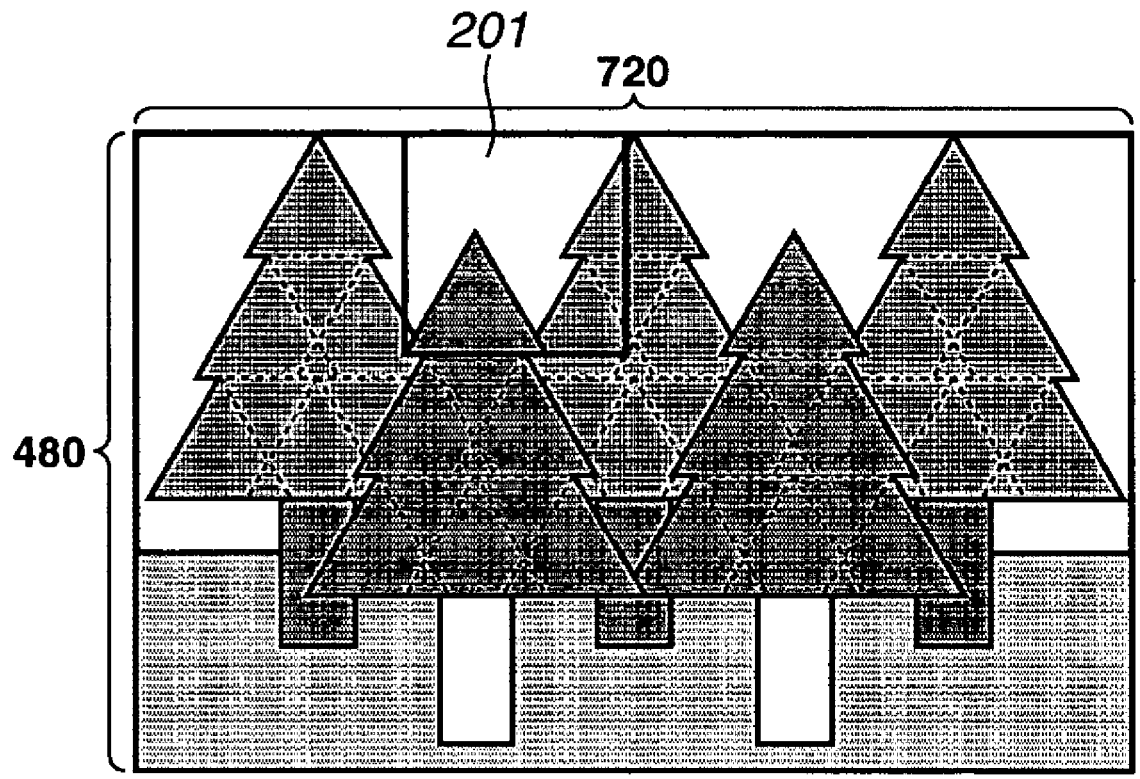
FIG. 2 illustrates an exemplary standard definition (SD) original image of 720×480 pixels.

FIG. 3 illustrates a portion of the decoded image by which compression and expansion is performed for the original image of FIG. 2. Here, the image size is assumed to have been an SD image of 720×480 pixels. Images of FIGS. 3A and 3B represent the decoded image corresponding to a 16×16 pixel block 201 enclosed by the bold line in FIG. 2. It will be appreciated that the figures are not to scale. If the image shown is 720×480 pixels, then the bolded area 201 in the image is much larger than a 16×16 pixel area. However, for ease of description herein, it will be assumed that the bolded area 201 in the image of FIG. 2 is 16×16 pixels. FIG. 3A illustrates the decoded image processed by the 4×4 pixel block, and FIG. 3B illustrates a decoded image processed by the 8×8 pixel block. The 8×8 pixel block 300 enclosed by the bold line in FIG. 3A is comprised by four 4×4 pixel blocks 301, 302, 303, and 304, and a block 305 enclosed by the bold line in FIG. 3B illustrates the 8×8 pixel block.

The block distortion is generated when the pixel value of boundaries of the block becomes discontinuous by a quantization process. That is, the block distortion is generated on the boundaries of the block which is discrete-cosine-transformed. FIGS. 3A and 3B illustrate the block distortion in the decoded image. The horizontal and vertical solid lines indicate the block distortion. FIG. 3A illustrates the block distortion in case the block size is the 4×4 pixels, and FIG. 3B illustrates the block distortion in case the block size is the 8×8 pixels. The block distortion of the block size of the 8×8 pixels is more conspicuous than the block size of the 4×4 pixels. That is, in cases where the decoded images, which are encoded and decoded with different block sizes for the same image, are appreciated using the display of the same resolution, the block distortion of the decoded image by the 8×8 pixel block is more visually conspicuous than that by the 4×4 pixel block.

The spatial frequency resolution is described below with reference to FIGS. 3A and 3B. Since the 4×4 discrete cosine transform is performed in the case of FIG. 3A, the spatial frequency resolution is low as the described above. Therefore, although the decoded image of a flat pattern with low spatial frequency like the block 301 is not blurred easily, the decoded image of a complicated pattern with high spatial frequency like the block 302 is blurred easily. On the other hand, since the 8×8 discrete cosine transform is performed in the case of FIG. 3B, the spatial frequency resolution is high and the decoded image of the complicated pattern is not blurred easily compared with the case where the block size is the 4×4 pixels as shown in FIG. 3A.

Thus, as described above, in cases where the image size is assumed to have been fixation, if the block size which performs the discrete cosine transform is made large (e.g., 8×8), the block distortion becomes conspicuous visually, but the decoded image of the complicated pattern becomes difficult to be blurred. On the other hand, if the block size which performs the discrete cosine transform is made small (e.g., 4×4), the block distortion becomes difficult to be conspicuous visually, but the decoded image of the complicated pattern becomes easy to be blurred.

Figure 4:
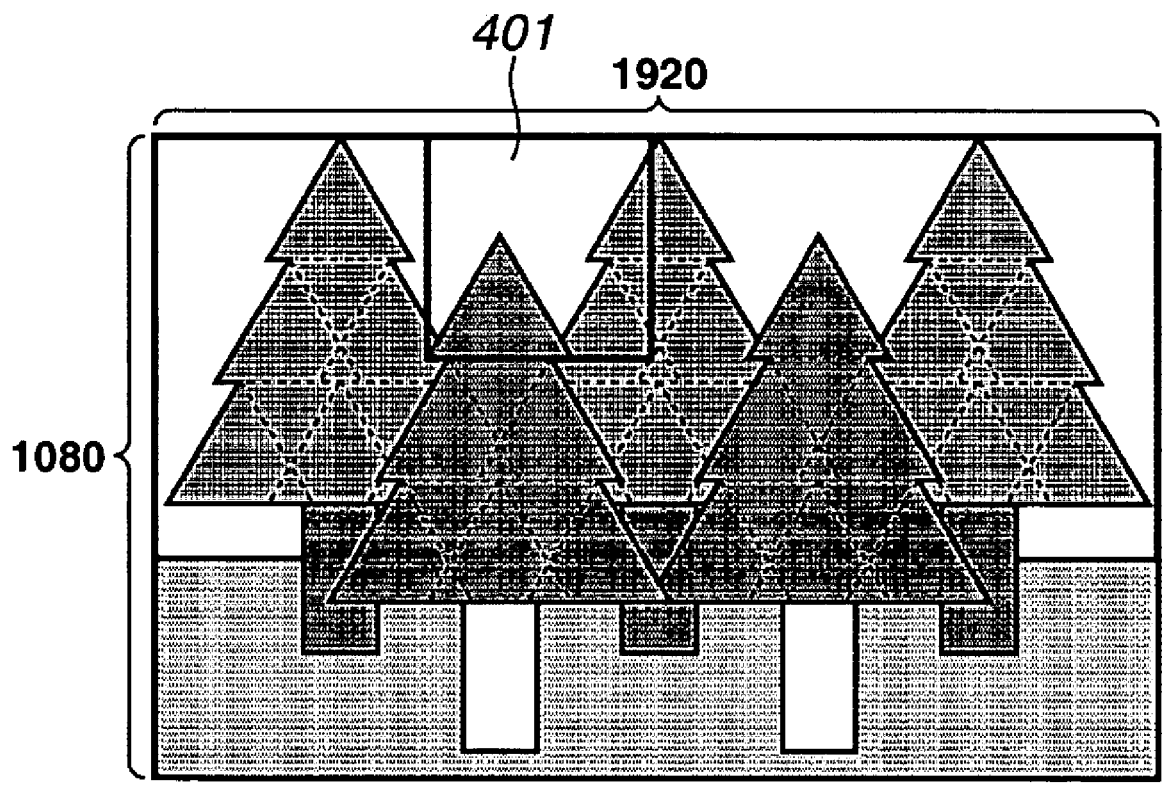
FIG. 4 illustrates a high definition (HD) original image of 1920×1080 pixels.

Here, the cases where the compression/expansion of the SD image and the HD image, which indicate the same object and are different in the image size, are compressed and expanded, and the decoded SD image and the decoded HD image are displayed with the same image size is described with reference to FIG. 2, FIG. 4, and FIG. 5. FIG. 2 illustrates the SD image, and FIG. 4 illustrates the HD image. The HD image has a high pixel density as compared with the pixel density of the SD image.

Figure 5A:
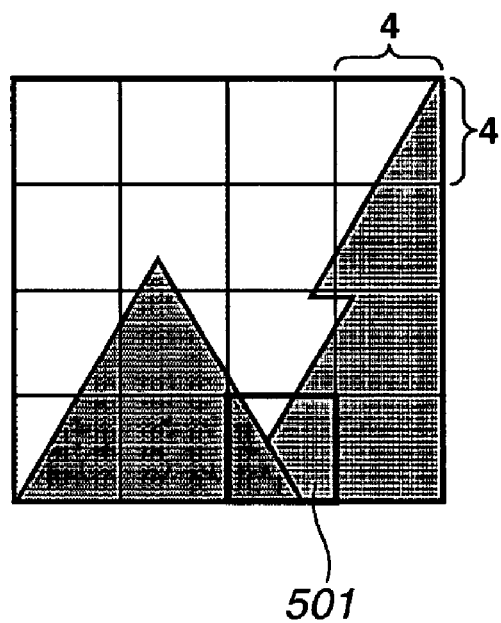
FIG. 5A illustrates a decoded SD image.
Figure 5B:
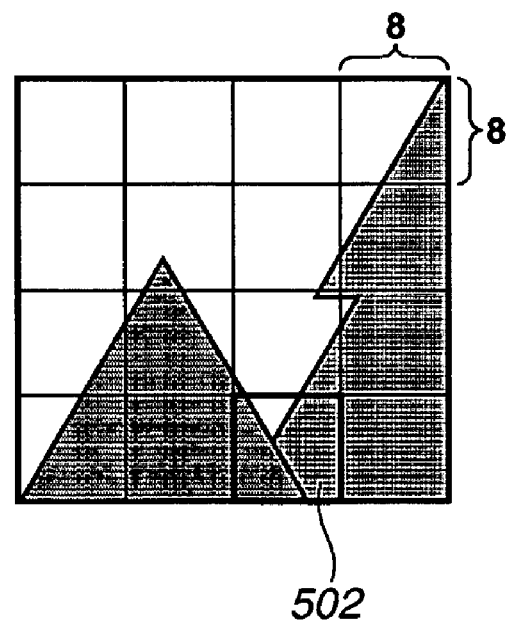
FIG. 5B illustrates a decoded HD image.

FIG. 5A illustrates the decoded SD image of the 16×16 pixels corresponding to the 16×16 pixel block 201 enclosed by the bold line in FIG. 2, and decoding the SD image is performed by the compression/expansion by the 4×4 pixel block. FIG. 5B illustrates the decoded HD image of the 32×32 pixels corresponding to the 32×32 pixel block 401 enclosed by bold line in FIG. 4, and decoding the HD image is performed by the compression/expansion by the 8×8 pixel block. As noted above with reference to FIG. 2, it will be appreciated that the figures are not to scale. If the image shown in FIG. 4 is 1920×1080 pixels, then the bolded area 401 in the image is much larger than a 32×32 pixel area. However, for ease of description herein, it will be assumed that the bolded area 401 in the image of FIG. 4 is 32×32 pixels. In cases where the block distortion is compared between FIG. 5A and FIG. 5B, the block sizes at the time of the compression/expansion are different, but the block distortion becomes almost the same because of the difference in the pixel density. The spatial frequency resolution of the decoded image of FIG. 5B (the block size is the 8×8 pixels) is higher than the decoded image of FIG. 5A (the block size is the 4×4 pixels). That is, in the image of the complicated pattern such as block 501 of FIG. 5A and block 502 of FIG. 5B, the condition of the block distortion thereof is equivalent, but the block size of the 8×8 pixels of FIG. 5B is not blurred as easily as the block size of the 4×4 pixels of FIG. 5A.

As described above, in cases where the SD image and the HD image are images of the same objects and the decoded images after being compressed and expanded are displayed with the same image size, the decoded image of the HD image which is not blurred as easily as the SD image can be obtained if the block size when performing compression/expansion of the HD image is made larger than the block size when performing compression/expansion of the SD image.

Figure 6:
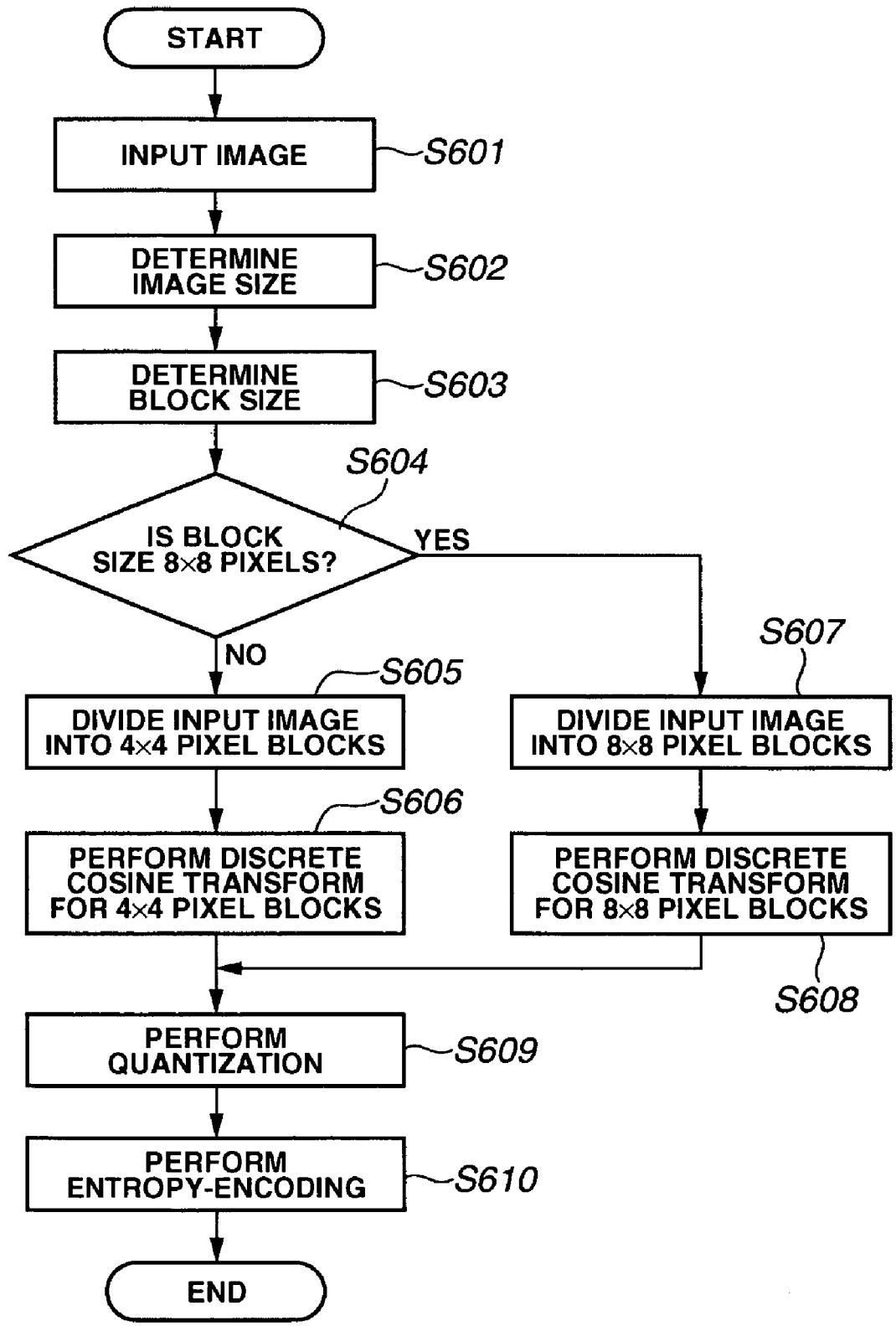
FIG. 6 is a flowchart illustrating exemplary process procedures of the image coding apparatus in a first embodiment.

Next, exemplary process procedures of the image coding apparatus of this invention which encodes after selecting the block size adaptively according to the image size of the input image are described with reference to the flowchart of FIG. 6.

First, in step S601, the image data is input. Next, in step S602, the image size determination unit 102 determines the image size of the input image data. That is, it is determined whether the input image is the SD image or the HD image. Next, in step S603, the block size determination unit 103 determines the block size according to the image size determination result of step S602. The block size determination unit 103 determines the block size as 4×4 pixels if the input image data is the SD image, and it determines the block size as 8×8 pixels if the input image data is the HD image.

Next, in step S604, it is determined whether the block size which is determined by the block size determination unit 103 (step S603) is the 8×8 pixels. If the block size is not 8×8 pixels (that is, the block size is the 4×4 pixels) (no in step S604), the processing proceeds to step S605. On the other hand, if the block size is 8×8 pixels (yes in step S604), the processing proceeds to step S607.

In step S605, the block construction unit 101 divides the input image data into 4×4 pixel blocks according to the result of the block size determination unit 103. Then, in step S606, the 4×4 discrete cosine transform unit 104 performs the discrete cosine transform for the 4×4 pixel blocks, and then the processing proceeds to step S609.

On the other hand, in step S607, the block construction unit 101 divides the input image data into 8×8 pixel blocks according to the result of the block size determination unit 103. Then, in step S608, the 8×8 discrete cosine transform unit 105 performs the discrete cosine transform for the 8×8 pixel blocks, and then the processing proceeds to step S609.

In step S609, the transform coefficients which are discrete cosine transformed in step S606 or step S608 are quantized by the quantization unit 108. Then, in step S610, the quantized coefficients are entropy-encoded by the entropy coding unit 109, and the coded data is output. The processing then ends. In this way, the output coded data becomes recordable with a recording and reproducing device, and it is possible to view the decoded image by decoding the coded data. When recording with the recording and reproducing device, the information which indicates whether it was processed by the 8×8 pixel block or the 4×4 pixel block is recorded with the coding data.

Figure 16:
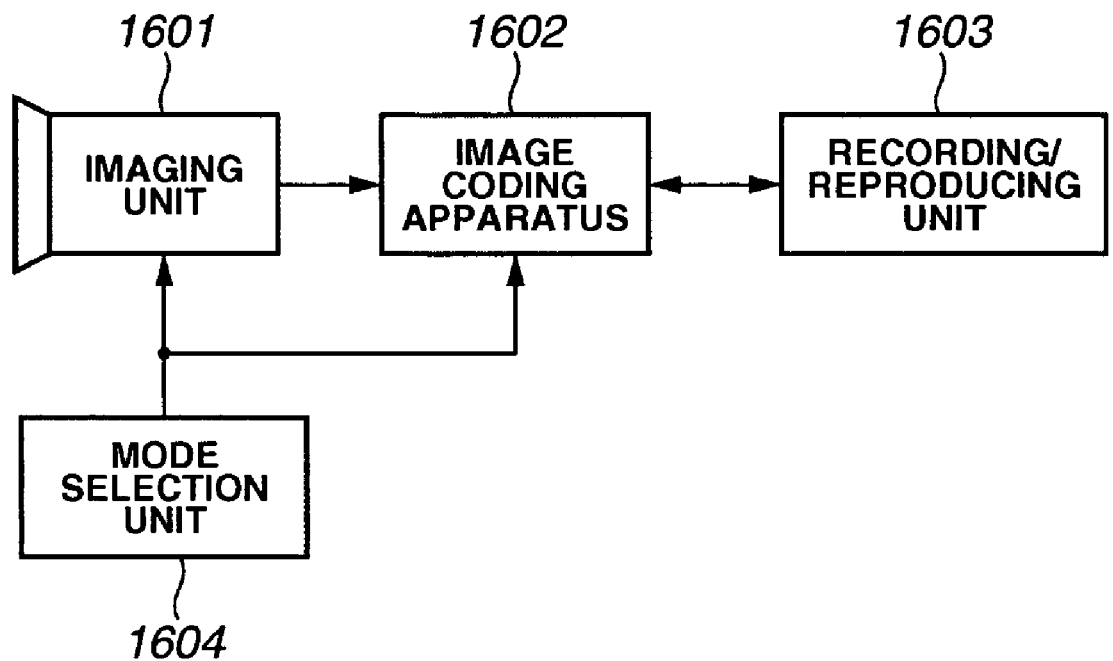
FIG. 16 is an exemplary block diagram of the imaging in the present invention.

Determining the input image size in step S602 may be modified as follows. The image size determination unit 102 may be configured so that it can determine a mode according to the image size (e.g., an image type, such as an HD image, an SD image, etc.), etc. specified by a user. For example, in an imaging apparatus (e.g., a digital video camera, etc.) with the image coding apparatus of this invention, in cases where a mode selection unit for selecting the image type is set as "HD image," the image size determination unit 102 determines the input image as the HD image based on a setting state of the mode selection unit and then determines the image size of the input image and in cases where a mode selection unit is set as "SD image," the image size determination unit 102 determines the input image as the SD image and then determines the image size of the input image. For example, the arrangement of the above-described imaging apparatus is shown in FIG. 16. An imaging unit 1601 picks-up the image data of an image type (the SD image or the HD image) selected by a mode selection unit 1604. An image coding apparatus 1602 encodes the image data picked-up by the imaging unit 1601. A recording/reproducing unit 1603 records the image data encoded by the image coding apparatus 1602 on the recoding medium and reproduces the recorded image data. The mode selection unit 1604 selects whether the HD image is recorded or the SD image is recorded. As described above, the image coding apparatus 1602 determines the image size based on the selecting state of the mode selection unit 1604. The coding process of the image coding apparatus 1602 is the same as that of FIG. 1 except the process of determining the image size.

The quantization process in step S609 may be modified as follows. If the determined block size is the 4×4 block size, the quantization unit 108 performs the quantization process by using a 4×4 quantization matrix. On the other hand, if the determined block size is the 8×8 block size, the quantization unit 108 performs the quantization process by using an 8×8 quantization matrix.

Thus, according to this embodiment, In the case where the input images are images of the same object and the decoded images are displayed with the same image size although the sizes of the input image are different, by changing the block size according to the image size of the input image, compared with the case where the block size is fixed like conventional technology (even when the image size of the input image is large), a decoded image with which the portion of the complicated pattern is not blurred easily can be obtained. Therefore, the image coding apparatus of this invention can obtain a high quality image compared with the conventional technology.

Second Embodiment

A second embodiment of the present invention is described next. A characteristic of the image coding apparatus of the present invention in the second embodiment is an arrangement which performs compression coding of the moving image using the coding method obtained by extending H.264.

Figure 12:
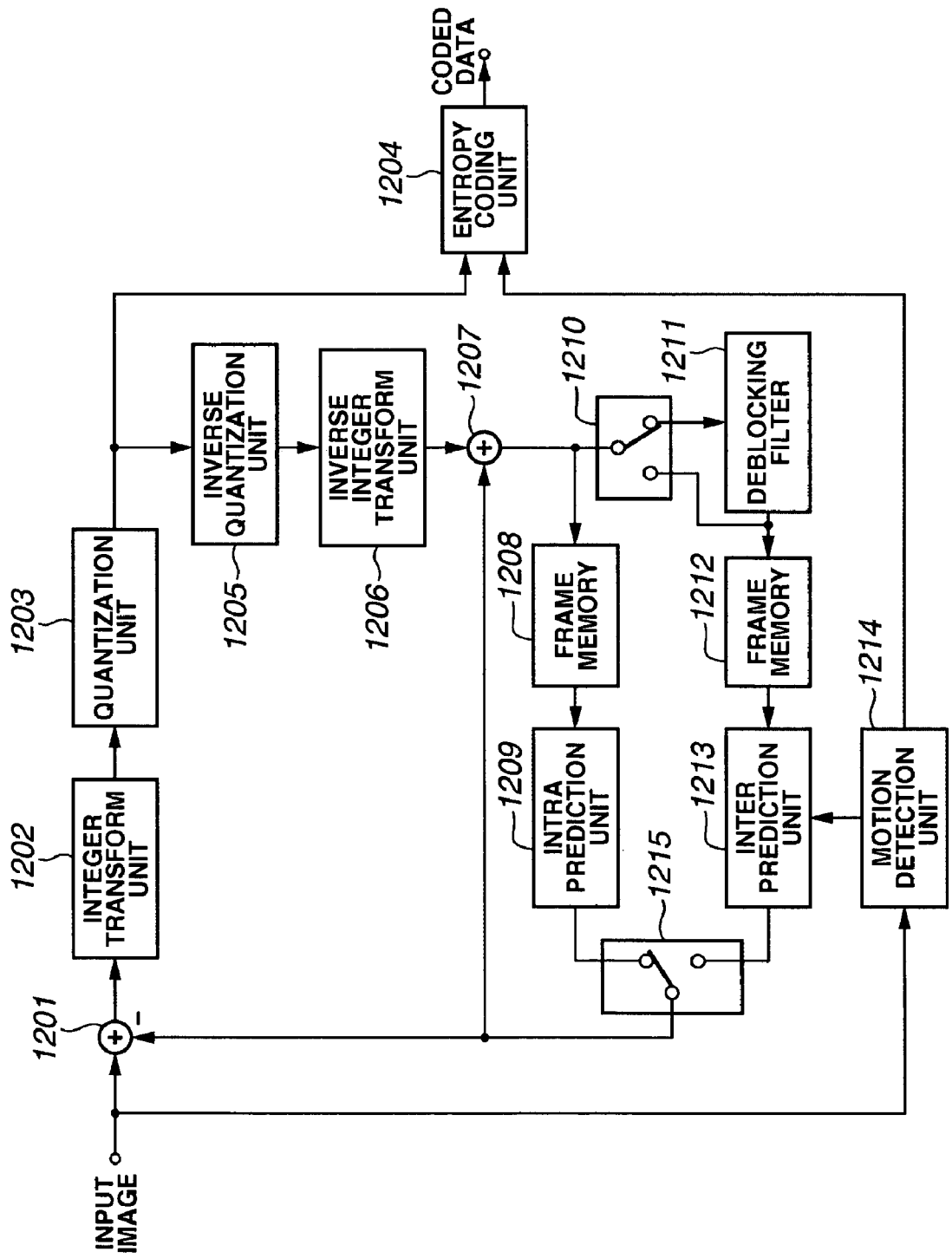
FIG. 12 is a block diagram of an image coding process of H.264.

Here, the block configuration of the image coding processing in H.264 is described below with reference to FIG. 12. The image coding apparatus of FIG. 12 includes a subtractor 1201, an integer transform unit 1202, a quantization unit 1203, an entropy coding unit 1204, an inverse quantization unit 1205, an inverse integer transform unit 1206, an adder 1207, frame memories 1208 and 1212, an intra prediction unit 1209, selection units 1210 and 1215, a deblocking filter 1211, an inter prediction unit 1213, and a motion detection unit 1214. The image coding apparatus of the second embodiment divides the input image data into a block, performs H.264 coding processing by the block unit, and outputs the coded data.

The H.264 coding process is described next with reference to FIG. 12.

First, the subtractor 1201 subtracts predicted image data from the input image data, and outputs difference data. The generating method of the predicted image data is described later.

The integer transform unit 1202 performs orthogonal transform for the difference data output from the subtractor 1201, and outputs transform coefficients. Then, the quantization unit 1203 quantizes the transform coefficients using a predetermined quantization parameter.

The entropy coding unit 1204 entropy-encodes the transform coefficients quantized by the quantization unit 1203, and outputs the coded data.

The transform coefficients quantized by the quantization unit 1203 are also used for generation of the predicted image data. The inverse quantization unit 1205 reverse-quantizes the transform coefficients quantized by the quantization unit 1203. The inverse integer transform unit 1206 performs reverse integer transform for the transform coefficients inverse-quantized by the inverse quantization unit 1205, and outputs decoded difference data. An adder 1207 adds the decoded difference data and the predicted image data, and outputs local decoded image data.

The local decoded image data is recorded in the frame memory 1208. The local decoded image data is also alternatively processed by the deblocking filter 1211. A selection unit 1210 selects whether the deblocking filter process is performed for the local decoded image data. The frame memory 1212 stores the local decoded image data output from the deblocking filter 1211 and the local decoded image data output from the selection unit 1210. The data which may be referred to as the predicted image data in subsequent coding process in the local decoded image data is stored in the frame memory 1208 or the frame memory 1212. The deblocking filter 1211 is used in order to remove noise.

The intra prediction unit 1209 performs intra-frame prediction processing using the local decoded image data stored in the frame memory 1208, and generates the predicted image data. The inter prediction unit 1213, using the local decoded image data stored in the frame memory 1212, performs inter-frame prediction processing based on motion vector information detected by a motion detection unit 1214, and generates the predicted image data. The motion detection unit 1214 detects the motion vector for the input image data, and outputs the detected motion vector information to the inter prediction unit 1213 and the entropy coding unit 1204.

The selection unit 1215 selects which predicted image data shall be used between the intra prediction and the inter prediction, i.e., the selection unit 1215 selects one of the output from the intra prediction unit 1209, and the output from the inter prediction unit 1213. The selection unit 1215 outputs the selected predicted image data to the subtractor 1201 and to the adder 1207. The above-described is a description with respect to the coding process of H.264 by the arrangement shown in FIG. 12.

The deblocking filter in H.264 is described below. In the coding method of H.264, setting the deblocking filter (e.g., the deblocking filter 1211 of FIG. 12) for performing filtering for the local decode image is specified. There is no such specifying in MPEG-1 and MPEG-2. The deblocking filter 1211 smoothes the boundary portion of the block, removes the block distortion in the local decoded image, and prevents block distortion propagation in the image which refers to the local decoded image in a motion compensation process. This is described in more detail in the literature of ITU-T H.264 or ISO/IEC 14496-10 of ISO/IEC MPEG-4 Part 10.

The integer transform in H.264 is described next. The coding process by using the discrete cosine transform of the 8×8 pixel unit is performed in MPEG-1 and MPEG-2. On the other hand, the coding process by using the integer transform is performed in H.264.

the integer transform used in the coding method of H.264 is described below. The equation (5) of the above-described descrete cosine transform can be changed into the following equation (6):

$$\begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} = \left( \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \right. \quad (6)$$

$$\left. \begin{bmatrix} 1 & 2 & 1 & 1 \\ 1 & 1 & -1 & -2 \\ 1 & -1 & -1 & 2 \\ 1 & -2 & 1 & -1 \end{bmatrix} \right) \otimes \begin{bmatrix} c^2 & \frac{cd}{2} & c^2 & \frac{cd}{2} \\ cd & \frac{d^2}{4} & cd & \frac{d^2}{4} \\ c^2 & \frac{cd}{2} & c^2 & \frac{cd}{2} \\ \frac{cd}{2} & \frac{d^2}{4} & \frac{cd}{2} & \frac{d^2}{4} \end{bmatrix}$$

where

-continued $$c = \frac{1}{2}, d = \sqrt{\frac{2}{5}}$$

The integer transform of H.264 uses integer transform matrix as the following:

$$\begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

The following equation (7) as the integer transform is specified:

$$\begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \begin{bmatrix} 1 & 2 & 1 & 1 \\ 1 & 1 & -1 & -2 \\ 1 & -1 & -1 & 2 \\ 1 & -2 & 1 & -1 \end{bmatrix} \quad (7)$$

This integer transform can be calculated by the processing of adding and shifting.

$$\begin{bmatrix} c^2 & \frac{cd}{2} & c^2 & \frac{cd}{2} \\ cd & \frac{d^2}{4} & cd & \frac{d^2}{4} \\ c^2 & \frac{cd}{2} & c^2 & \frac{cd}{2} \\ \frac{cd}{2} & \frac{d^2}{4} & \frac{cd}{2} & \frac{d^2}{4} \end{bmatrix}$$

The above-described term is calculated by performing different quantization processing for each component of the 4×4 pixel block. That is, in H.264, the orthogonal transformation is realized by combining the integer transform and the quantization process. This is described in more detail in the literature of ITU-T H.264 or ISO/IEC 14496-10 of ISO/IEC MPEG-4 Part 10.

Figure 15:
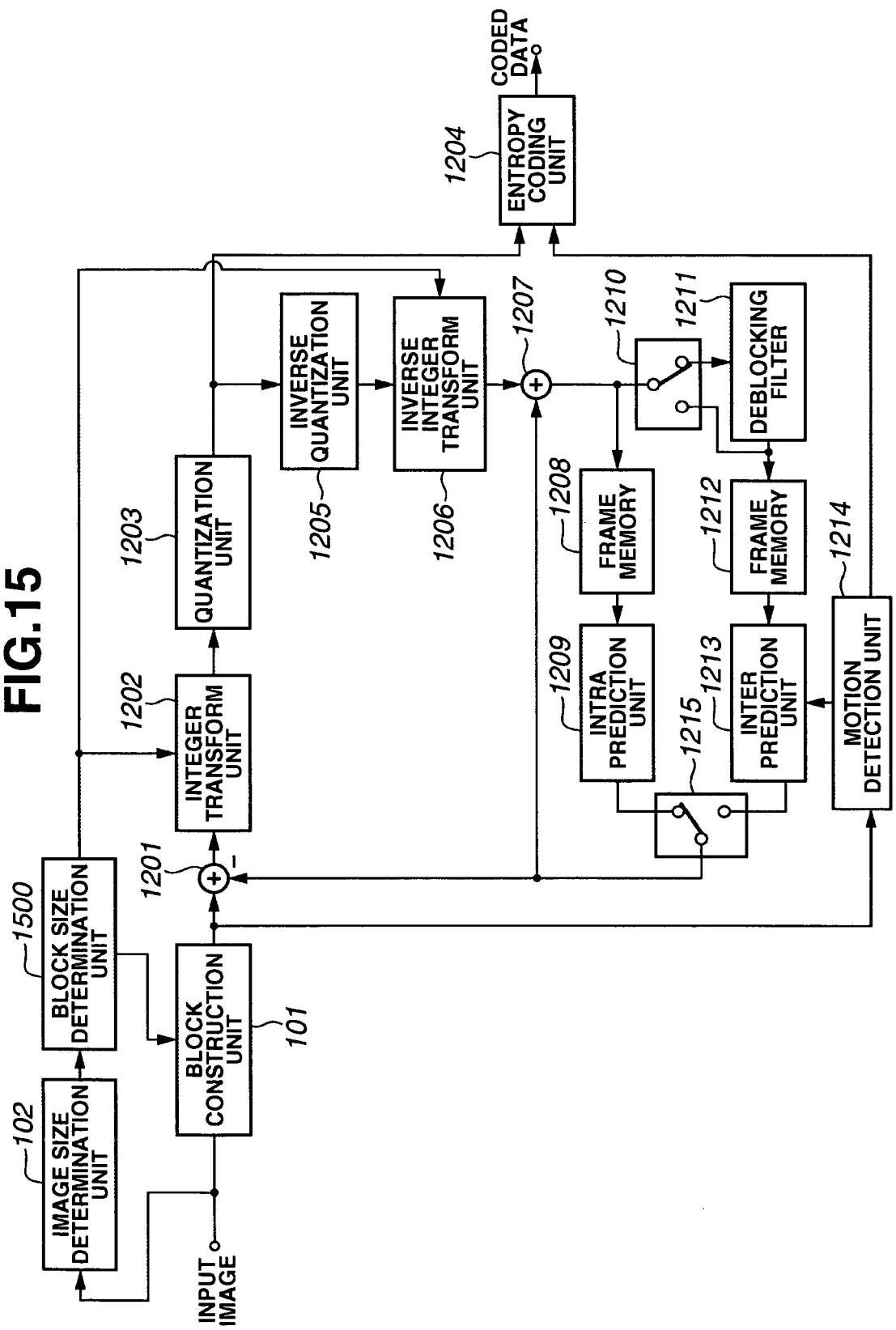
FIG. 15 is an exemplary block diagram of the image coding apparatus in the second embodiment of the present invention.

In the image coding apparatus using the above-described coding method of H.264, it is applicable to select the block size at the time of coding according to the input image size like the first embodiment. However, in the H.264 of the current standard, the block size which performs an integer transform is fixed to the 4×4 pixel block. Therefore, in the second embodiment, the current integer transform process is made to extend and the case where processing of at least an 8×8 pixel block is enabled at least in addition to the 4×4 pixel block. FIG. 15 illustrates the block diagram of the image coding apparatus which enables the above-described transform process. Components in FIG. 15 that have the same function as components in FIG. 1 and FIG. 12 have the same reference number and explanation thereof is not repeated here.

In FIG. 15, a block size determination unit 1500 determines a block size formed in the block construction unit 101 according to the image size determined by the image size determination unit 102. Also, according to the determined block size, the block size determination unit 1500 controls a processing block size (4×4 pixels or 8×8 pixels) of the integer transform unit 1202 and the inverse integer transform unit 1206.

Figure 13:
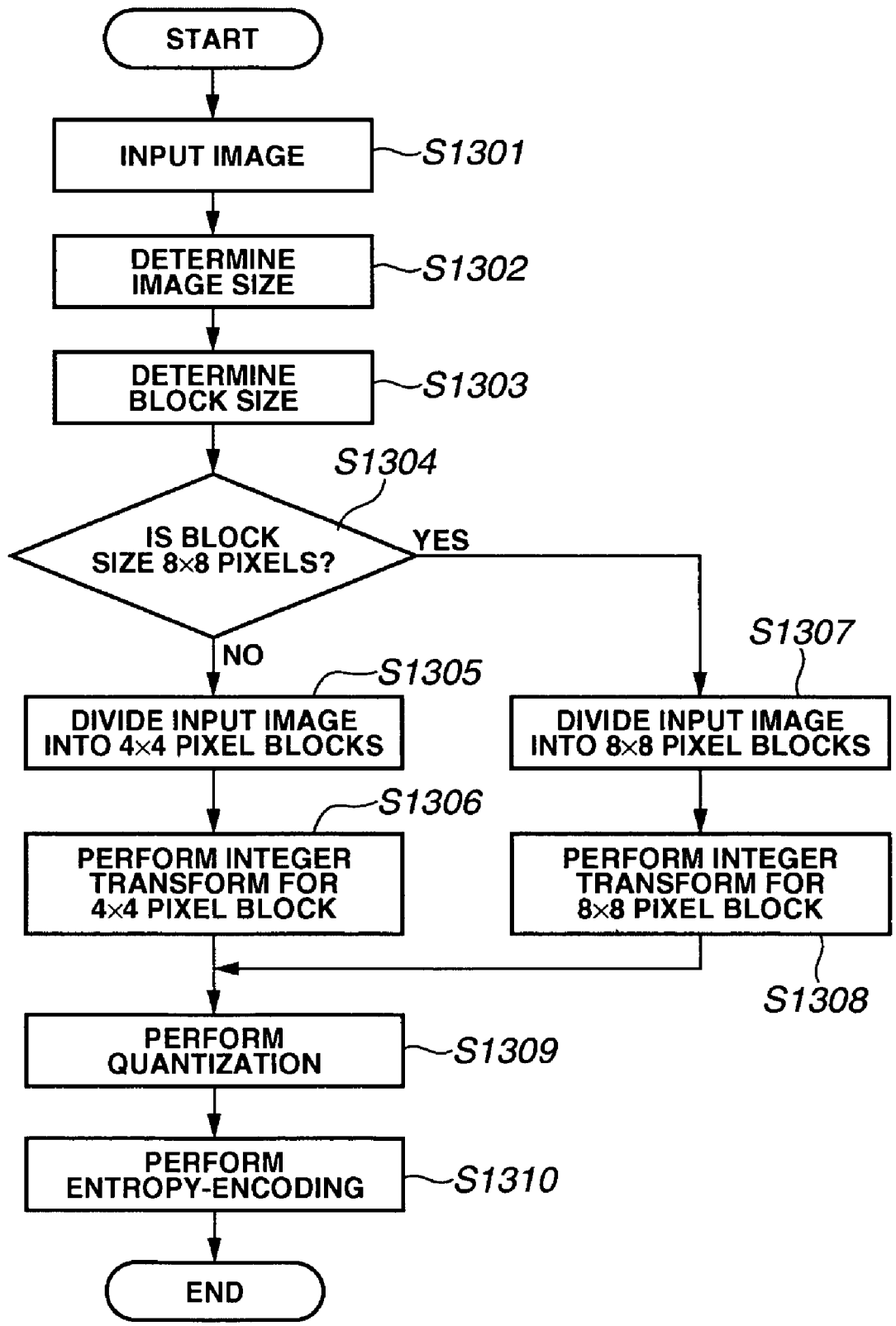
FIG. 13 is a flowchart illustrating exemplary process procedures of the image coding apparatus in a second embodiment.

Next, process procedures of the image coding apparatus of this invention which encodes after selecting the block size adaptively according to the image size of the input image are described with reference to the flowchart of FIG. 13.

First, in step S1301, the image data is input. Next, in step S1302, the image size determination unit 102 determines the image size of the input image data. That is, it is determined whether the input image data is an SD image or an HD image.

Next, in step S1303, the block size determination unit 1500 determines the block size according to the determination result of step S1302. The block size determination unit 1500 determines the block size as 4×4 pixels if the input image data is an SD image, and it determines the block size as 8×8 pixels if the input image data is an HD image.

Next, in step S1304, it is determined whether the block size which is determined by the block size determination unit 1500 is 8×8 pixels. If the block size is not 8×8 pixels (that is, the block size is 4×4 pixels) (no in step S1304), the processing proceeds to step S1305. On the other hand, if the block size is 8×8 pixels (yes in step S1304), the processing proceeds to step S1307.

In step S1305, the block construction unit 101 divides the input image data into 4×4 pixel blocks according to the result of the block size determination unit 1500. Then, in step S1306, the integer transform unit 1202 performs the integer transform for the 4×4 pixel blocks, and then the processing proceeds to step S1309.

On the other hand, in step S1307, the block construction unit 101 divides the input image data into 8×8 pixel blocks according to the result of the block size determination unit 1500. Then, in step S1308, the integer transform unit 1202 performs the integer transform for the 8×8 pixel blocks, and then the processing proceeds to step S1309.

In step S1309, the transform coefficients which is integer-transformed in step S1306 or step S1308 is quantized by the quantization unit 1203. Then, in step S1310, the quantized coefficients are entropy-encoded by the entropy coding unit 1204, and the coded data is output. Processing then ends. In this way, the output coding data becomes recordable with a recording and reproducing device, and it is possible to view the decoded image by decoding the coded data. When recording with the recording and reproducing device, the information which indicates whether it was processed by the 8×8 pixel block or the 4×4 pixel block is recorded with the coding data.

In cases where the image coding apparatus in this embodiment is applied to an imaging apparatus, the image data picked-up by an imaging unit is equivalent to the input image data in the image coding apparatus of this embodiment.

The determination process of the image size of the input image in step S1302 may be modified like the first embodiment. That is, the image size determination unit 102 may be configured so that it can determine the image size according to a mode (e.g., an image type such as HD image, the SD image, etc.), etc. specified by a user. For example, in an imaging apparatus (e.g., a digital video camera, etc.) with the image coding apparatus of the present invention, in cases where a mode selection unit for selecting the image type is set as "HD image," the image size determination unit 102 determines the input image as the HD image based on a setting state of the mode selection unit and then determines the image size of the input image, and in cases where a mode selection unit is set as "SD image," the image size determination unit 102 determines the input image as the SD image and then determines the image size of the input image. For example, the arrangement of the above-described imaging apparatus is shown in FIG. 16. An imaging unit 1601 picks-up the image data of an image type (the SD image or the HD image) selected by a mode selection unit 1604. An image coding apparatus 1602 encodes the image data picked-up by the imaging unit 1601. A recording/reproducing unit 1603 records the image data encoded by the image coding apparatus 1602 on the recoding medium and reproduces the recorded image data. The mode selection unit selects whether the HD image is recorded or the SD image is recorded. As described above, the image coding apparatus 1602 determines the image size based on the selecting state of the mode selection unit 1604. The coding process of the image coding apparatus 1602 is the same as that of FIG. 15 except the determining process of the image size.

The quantization process in step S1309 may be modified as follows. If the determined block size is the 4×4 block size, the quantization unit 1203 performs the quantization process by using a 4×4 quantization matrix, and the inverse quantization unit 1206 performs the inverse-quantization process by using a 4×4 inverse-quantization matrix. On the other hand, if the determined block size is the 8×8 block size, the quantization unit 108 performs the quantization process by using an 8×8 quantization matrix and the inverse quantization unit 1206 performs the inverse-quantization process by using an 8×8 inverse-quantization matrix.

Thus, according to the second embodiment, like the first embodiment, compared with the case where the block size is fixed like conventional (even when the image size of the input image is large), the decoded image with which the portion of a complicated pattern does not blur can easily be obtained. The image coding apparatus of the present invention can obtain a high quality image compared with the conventional technology. Then, by enabling change of the block size in the coding process of H.264, improvement in quality of image can be realized and the increase in efficiency of the coding processing by corresponding to the 8×8 pixels can also be expected.

Third Embodiment

A third embodiment is described next with reference to the accompanying drawings.

Figure 7:
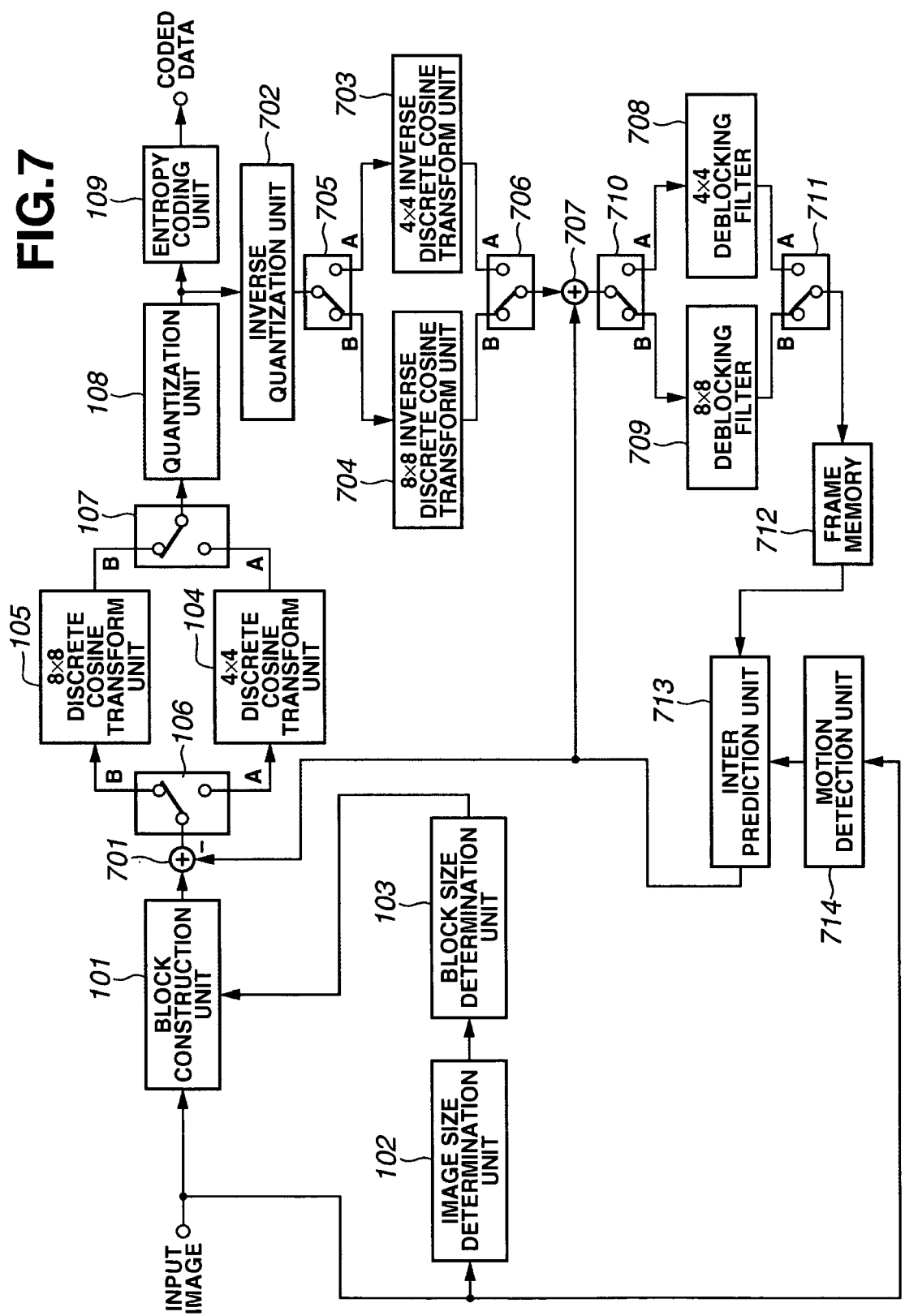
FIG. 7 is an exemplary block diagram of an image coding apparatus in a third embodiment of the present invention.

FIG. 7 is the block diagram of the image coding apparatus in the third embodiment. The image coding apparatus of FIG. 7 is characterized by having an arrangement which changes processing of a deblocking filter according to the determined block size in addition to the arrangement of the image coding apparatus of FIG. 1 explained in the first embodiment. Components in FIG. 7 that have the same function as components in FIG. 1 have the same reference number and explanation thereof is not repeated here.

A subtractor 701 subtracts predicted image data from the input image data. An inverse quantization unit 702 performs an inverse quantization. A 4×4 inverse discrete cosine transform unit 703 performs an inverse discrete cosine transform for the 4×4 pixel block. An 8×8 inverse discrete cosine transform unit 704 performs an inverse discrete cosine transform for the 8×8 pixel block. Selection units 705 and 706 select one of the 4×4 inverse discrete cosine transform 703 (a path by the side of "A" in the selection units 705 and 706) and the 8×8 inverse discrete cosine transform unit 704 (a path by the side of "B" in the selection units 705 and 706).

An adder 707 adds decoded difference data and the predicted image data and outputs local decoded image data. A 4×4 deblocking filter 708 performs a filtering process (described later) for the 4×4 pixel block. An 8×8 deblocking filter 709 performs a filtering process (described later) for the 8×8 pixel block. Selection units 710 and 711 select one of the 4×4 deblocking filter 708 (a path by the side of "A" in the selection units 710 and 711) and the 8×8 deblocking filter 709 (a path by the side of "B" in the selection units 710 and 711).

A frame memory 712 stores the local decoded image data. An inter prediction unit 713 performs an inter-frame prediction. A motion detection unit 714 detects a motion between frames.

Next, the operation of the image coding apparatus of FIG. 7 is described below.

First, the subtractor 701 subtracts the predicted image data from the input image data, and outputs the difference data. The generating method of the predicted image data is described later. The quantized transform coefficients are entropy-encoded by the entropy coding unit 109, and are inverse-quantized by the inverse quantization unit 702.

The selection units 705 and 706 select "A" of FIG. 7, in cases where the block size determined by the block size determination unit 103 is 4×4 pixels. That is, the processing in the 4×4 inverse discrete cosine transform unit 703 is selected. Otherwise, the selection units 705 and 706 select "B" of FIG. 7, in cases where the block size determined by the block size determination unit 103 is 8×8 pixels. That is, the processing in the 8×8 inverse discrete cosine transform unit 704 is selected. The selected 4×4 inverse discrete cosine transform unit 703 or 8×8 inverse discrete cosine transform unit 704 performs the inverse discrete cosine transform for the block and outputs decoded difference data.

An adder 707 adds the decoded difference data and the predicted image data, and outputs local decoded image data.

The selection units 710 and 711 select "A" of FIG. 7, in cases where the block size determined by the block size determination unit 103 is 4×4 pixels. That is, the processing in the 4×4 deblocking filter 708 is selected. Otherwise, the selection units 710 and 711 select "B" of FIG. 7, in cases where the block size determined by the block size determination unit 103 is 8×8 pixels. That is, the processing in the 8×8 deblocking filter 709 is selected. The selected 4×4 deblocking filter 708 or 8×8 deblocking filter 709 performs the deblocking filter process for the local decoded image data. The local decoded image data filtered by the 4×4 deblocking filter 708 or the 8×8 deblocking filter 709 is stored in the frame memory 712.

The inter prediction unit 713, using the local decoded image data stored in the frame memory 712, performs inter-frame prediction processing based on motion vector information detected by the motion detection unit 714, and generates the predicted image data.

Next, the deblocking filter process in the image coding apparatus of FIG. 7 is described below with reference to FIG. 8, FIG. 9 and FIG. 10. Here, the example which performs smoothing filtering which uses a 3×3 mask filter as a deblocking filter process is described. However, the deblocking filter process is not limited to that filtering which uses the 3×3 mask filter.

Figures 8A, 8B:
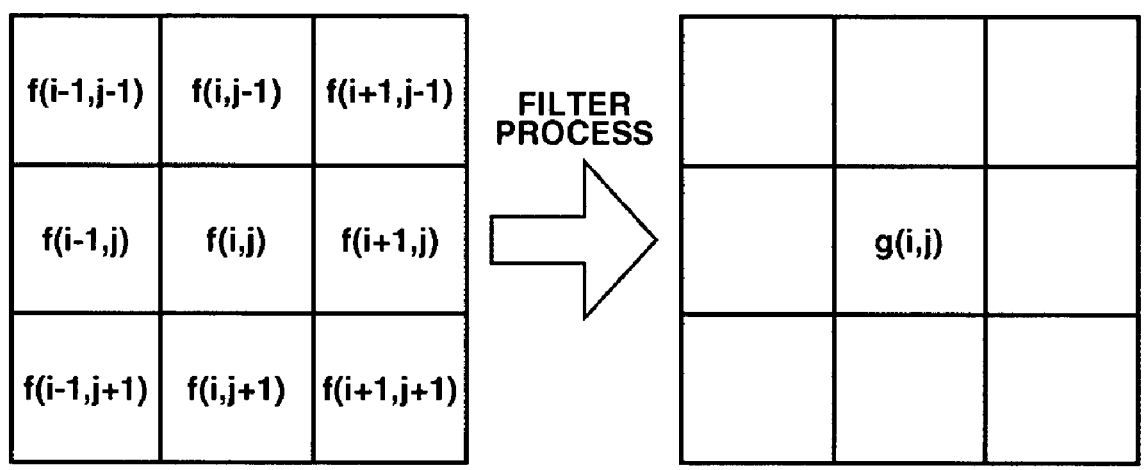
FIG. 8 illustrates an exemplary process of a deblocking filter.

In FIG. 8A, f(i, j) (i and j are integers) indicates a value of a pixel of interest by which the filter is performed. In FIG. 8B, g(i, j) indicates a value of the filtering-processed f(i, j). The g(i, j) is determined based on pixel values (that is, in FIG. 8A, f(i−1, j−1), f(i, j−1), f(i+1, j−1), f(i−1, j), f(i, j), f(i+1, j), f(i−1, j+1), f(i, j+1), and f(i+1, j+1)) on the 3×3 mask filter which surround the pixel of interest before filtering.

Next, filtering using the 3×3 mask filters is described with reference to FIG. 9. The number indicated in FIG. 9 indicates the filter factor by which the pixel value corresponding to each position is multiplied.

Figure 9:
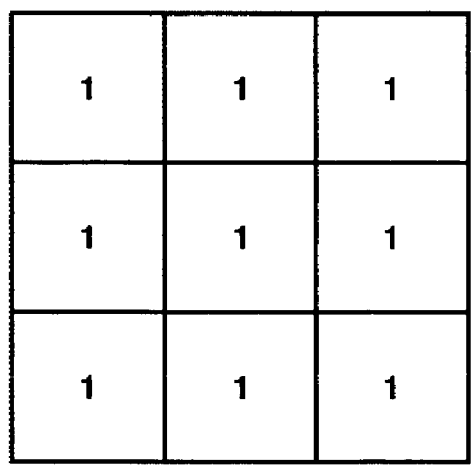
FIG. 9 illustrates an exemplary mask filter.

The pixel value g(i, j) after filtering in the case of filtering using the 3×3 mask filter of FIG. 9 can be expressed by the following equation:

$$g(i, j) = \left\{ \sum_{m=-1}^{1} \sum_{n=-1}^{1} f(i+m, j+n) \right\} \div 9 \qquad (8)$$

where m and n are integers. A difference value between the value of the pixel around the pixel of interest and the value of the pixel of interest becomes small by performing this filtering.

Next, the pixel which performs filtering is described with reference to FIG. 10. FIG. 10A and FIG. 10B illustrate the image to which the portion in the image of one frame is enlarged. In FIGS. 10A and 10B, a small square in the block enclosed by the bold line indicates one pixel. The size of the block enclosed by the bold line in FIG. 10A is 8×8 pixels, and the size of the block enclosed by the bold line in FIG. 10B is 4×4 pixels.

Here, the filtering process for the case in which the block size is 8×8 pixels is described with reference to FIG. 10A.

The above-described filtering process is performed for one certain pixel indicated by cross-hatched region in FIG. 10A as the f(i, j) which is the pixel of interest. This processing is performed for all the pixels indicated by cross-hatched region, i.e., the block boundary pixel of the 8×8 pixel block. By performing the filtering process for the block boundary pixel of the 8×8 pixel block, the difference value between the block boundary pixel values can become small, and the block distortion can be reduced. Also in cases where the block size is 4×4 pixels, the above-described filtering process is performed for one certain pixel indicated by cross-hatched region in FIG. 10B as the f(i, j) which is the pixel of interest.

Next, exemplary process procedures of the image coding apparatus of the third embodiment are described with reference to the flowchart of FIG. 11. In particular, the processes of the (inverse) discrete cosine transform and the deblocking filter according to the image size of the input image is described. Steps in FIG. 11 that have the same process as steps in FIG. 6 have the same step number and explanation thereof is not repeated here.

First, as described above, in step S601 to step S609, the block size of according to the input image size is determined, the discrete cosine transform according to the determined block size is performed, and the quantization is performed.

Then, in cases where the block size is 4×4 pixels, in step S1101, the inverse quantization unit 702 inverse-quantizes the transform coefficient quantized by the quantization unit 108. Next, in step S1102, the inverse discrete cosine transform is performed by the 4×4 inverse discrete cosine transform unit 703 for the 4×4 pixel block. In step 1103, the deblocking filter process is performed by the 4×4 deblocking filter unit 708 for the boundary pixel of the 4×4 pixel block.

In cases where the block size of is the 8×8 pixels, in step S1104, the inverse quantization unit 702 inverse-quantizes the transform coefficient quantized by the quantization unit 108. Next, in step S1105, the inverse discrete cosine transform is performed by the 8×8 inverse discrete cosine transform unit 704 for the 8×8 pixel block. In step 1106, the deblocking filter process is performed by the 8×8 deblocking filter unit 709 for the boundary pixel of the 8×8 pixel block.

After the deblocking filter process is performed (in step S1103 or step S1106), the above-described operation procedures (e.g., inter prediction etc.) are performed, and then, the coding data is output. Processing then ends. In this way, the output coding data becomes recordable with a recording and reproducing device (not shown), and it is possible to view the decoded image by decoding the coded data. When recording with the recording and reproducing device, the information which indicates whether it was processed by the 8×8 pixel block or the 4×4 pixel block is recorded with the coding data.

In cases where the image coding apparatus in this embodiment is applied to an imaging apparatus, the image data picked-up by an imaging unit is equivalent to the input image data in the image coding apparatus of this embodiment.

Figure 11:
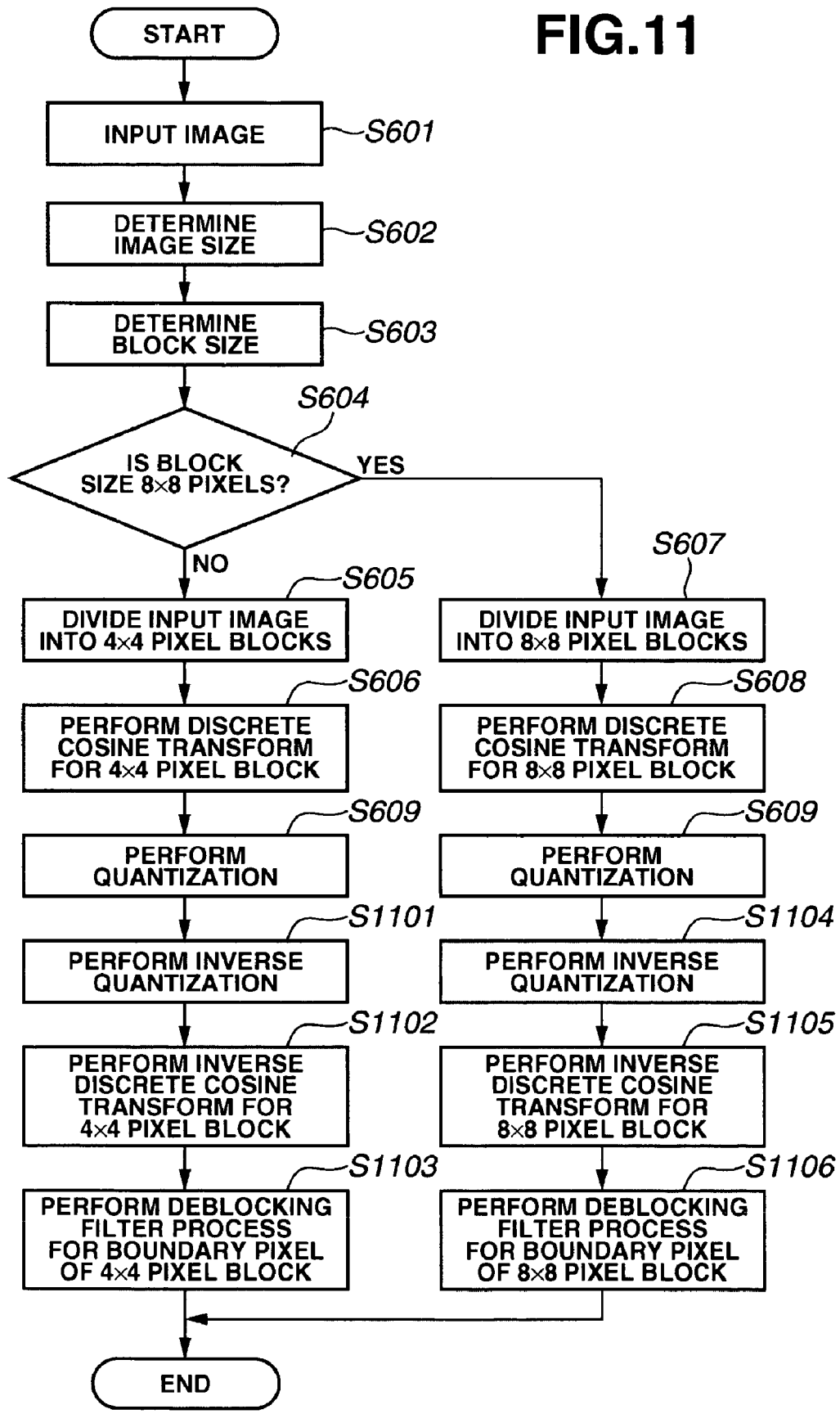
FIG. 11 is a flowchart illustrating exemplary process procedures of the image coding apparatus in a third embodiment.

Additionally, the determination process of the image size of the input image in step S602 of FIG. 11 may be modified like the first embodiment. That is, the image size determination unit 102 may be configured so that it can determine according to the image size, a mode (e.g., an image type, such as the HD image, the SD image, etc.), etc. specified by a user. For example, in an imaging apparatus (e.g., a digital video camera, etc.) with the image coding apparatus of this invention, in cases where a mode selection unit for selecting the image type is set as "HD image," the image size determination unit 102 determines the input image as the HD image based on a setting state of the mode selection unit and then determines the image size of the input image, and in cases where a mode selection unit is set as "SD image," the image size determination unit 102 determines the input image as the SD image and then determines the image size of the input image. For example, the arrangement of the above-described imaging apparatus is shown in FIG. 16. The imaging unit 1601 picks-up the image data of an image type (the SD image or the HD image) selected by the mode selection unit 1604. The image coding apparatus 1602 encodes the image data picked-up by the imaging unit 1601. A recording/reproducing unit 1603 records the image data encoded by the image coding apparatus 1602 on the recording medium and reproduces the recorded image data. The mode selection unit selects whether the HD image is recorded or the SD image is recorded. As described above, the image coding apparatus 1602 determines the image size based on the selecting state of the mode selection unit 1604. The coding process of the image coding apparatus 1602 is the same as that of FIG. 7 except the determining process of the image size.

The quantization process in step S609 of FIG. 11 may be modified as follows. If the determined block size is a 4×4 block size, the quantization unit 108 performs the quantization process by using a 4×4 quantization matrix, and the inverse quantization unit 702 performs the inverse-quantization process by using a 4×4 inverse-quantization matrix. On the other hand, if the determined block size is an 8×8 block size, the quantization unit 108 performs the quantization process by using an 8×8 quantization matrix and the inverse quantization unit 702 performs the inverse-quantization process by using an 8×8 inverse-quantization matrix.

Thus, according to this embodiment, by changing the block size according to the image size of the input image, compared with the case where the block size is fixed like conventional technology (even when the image size of the input image is large), the decoded image with which the portion of the complicated pattern is not blurred easily can be obtained. Additionally, by changing the block size of the filtering process according to the determined block size, the apparatus of the apparatus of this embodiment can perform a suitable filtering process for the portion of the block distortion expected to be generated. The high quality image with which the block distortion was thus reduced effectively can be obtained.

Other Embodiments

The present invention can be applied to an apparatus consisting of a single device or to a system including a plurality of devices.

Furthermore, the invention can be implemented by supplying a software program, which implements the functions of the foregoing embodiments, directly or indirectly-to a system or apparatus, reading the supplied program code with a computer of the system or apparatus, and then executing the program code.

In this case, so long as the system or apparatus has the functions of the program, the program may be executed in any form, such as object code, a program executed by an interpreter, or script data supplied to an operating system (OS).

Example of storage media that can be used for supplying the program include a floppy disk, a hard disk, an optical disk, a magneto-optical disk, a CD-ROM (compact disk-read-only memory), a CD-R (CD-recordable), a CD-RW (CD-rewritable), a magnetic tape, a non-volatile type memory card, a ROM, a DVD (digital versatile disk, e.g., a DVD-ROM and a DVD-R), and a Blu-ray Disc.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium it can be written to a function expansion board inserted into the computer or to a memory provided in a function expansion unit connected to the computer. A central processing unit (CPU) or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Application No. 2004-345281, filed Nov. 30, 2004, which is hereby incorporated by reference herein.

What is claimed is:

1. An image coding apparatus for performing a coding process, the image coding apparatus comprising:
a mode selection unit arranged to select a definition type of an input image;
an input unit arranged to input image data in accordance with an output of the mode selection unit;
an image size determination unit arranged to determine an image size of the image data input by the input unit in accordance with the output of the mode selection unit;
a plurality of orthogonal transform units arranged to perform an the image data input by the input unit image data, wherein the plurality of the orthogonal transform units perform the orthogonal-transform corresponding to each of different block sizes;
a block size determination unit arranged to determine a block size of the image data input by the input unit in accordance with the image size determined by the image size determination unit; and
a block construction unit arranged to divide the image data input by the input unit into blocks of the block size determined by the block size determination unit, to select one of the plurality of orthogonal transform units in accordance with the block size determined by the block size determination unit, and to supply image data divided into the blocks to the selected orthogonal transform unit.

2. An image coding apparatus according to claim 1, wherein the block size determination unit is arranged to determine a first block size if the image size determined by the image size determination unit is a first image size and a second block size larger than the first block size if the image size determined by the image size determination unit is a second image size larger than the first image size.

3. An image coding apparatus according to claim 2, wherein the first block size is 4×4 pixels and the second block size is 8×8 pixels.

4. An image coding apparatus according to claim 2, wherein the image size determination unit determines the first image size if the mode selection unit selects a standard definition image data and the second image size if the mode selection unit selects a high definition image data.

5. An image coding apparatus according to claim 4, wherein the first block size is 4×4 pixels and the second block size is 8×8 pixels.

6. An image coding apparatus according to claim 1, wherein each of the orthogonal transform units are arranged to orthogonal-transform the blocks by performing a discrete cosine transform, an integer transform, or a Hadamard transform.

7. An image coding apparatus according to claim 1, wherein the block construction unit is arranged to select the orthogonal transform for a 4×4 pixel block and the orthogonal transform for an 8×8 pixel block according to the block size.

8. An image coding apparatus according to claim 1, further comprising a filter arranged to perform a filtering process in accordance with the block size.

9. An image coding apparatus according to claim 8, wherein the filter is arranged to selectively perform the filtering process for a 4×4 pixel block and the filtering process for an 8×8 pixel block in accordance with the block size.

10. An image coding apparatus according to claim 8, wherein the filter is arranged to perform a smoothing filter process for a pixel of a boundary of the blocks divided by the block construction unit.

11. An image coding apparatus according to claim 10, further comprising a prediction coding unit arranged to encode the image data by using prediction image data, wherein the filter is a deblocking filter which performs the filtering process for the image data for generating the prediction image data.

12. An image coding apparatus for performing a coding process, the image coding apparatus comprising:
   an input unit arranged to input image data;
   an image size determination unit arranged to determine an image size of the image data input by the input unit;
   a plurality of orthogonal transform units arranged to perform an orthogonal-transform for the image data input by the input unit, wherein the plurality of the orthogonal transform units perform the orthogonal-transform corresponding to each of different block sizes;
   a block size determination unit arranged to determine a block size of the image data input by the input unit in accordance with the image size determined by the image size determination unit;
   a block construction unit arranged to divide the image data input by the input unit into blocks of the block size determined by the block size determination unit, select one of the plurality of orthogonal transform units in accordance with the block size determined by the block size determination unit, and supply image data divided into the blocks to the orthogonal transform unit;
   an inverse orthogonal transform unit arranged to perform an inverse orthogonal transform to output data from the selected orthogonal transform unit, using the same block size as determined by the block size determination unit; and
   a filter arranged to perform a filtering process to output data from the inverse-orthogonal-transform unit, in accordance with the block size determined by the block size determination unit.

13. An image coding apparatus according to claim 12, wherein the block size determination unit is arranged to determine a first block size if the image size determined by the image size determination unit is a first image size, and a second block size larger than the first block size if the image size determined by the image size determination unit is a second image size larger than the first image size.

14. An image coding apparatus according to claim 13, wherein the first block size is 4×4 pixels and the second block size is 8×8 pixels.

15. An image coding apparatus according to claim 13, wherein the image size determination unit determines the first image size if the image data input by the input unit is standard definition image data and the second image size if the image data input by the input unit is high definition image data.

16. An image coding apparatus according to claim 15, wherein the first block size is 4×4 pixels and the second block size is 8×8 pixels.

17. An image coding apparatus according to claim 12, wherein each of the orthogonal transform units are arranged to orthogonal-transform the blocks by performing a discrete cosine transform, an integer transform, or a Hadamard transform.

18. An image coding apparatus according to claim 12, wherein the block construction orthogonal transform unit is arranged to select the orthogonal transform for a 4×4 pixel block and the orthogonal transform for an 8×8 pixel block in accordance with the block size.

19. An image coding apparatus according to claim 12, wherein the filter is arranged to perform a smoothing filter for a pixel of a boundary of the block divided by the block construction unit.

20. An image coding apparatus according to claim 19, further comprising a prediction coding unit arranged to encode the image data by using prediction image data, wherein the filter is a deblocking filter which performs the filtering process for the image data for generating the prediction image data.

21. An image coding apparatus for performing a coding process, the image coding apparatus comprising:
   an input unit arranged to selectively input standard definition image data and high definition image data;
   an image size determination unit arranged to determine whether the image data input by the input unit is standard definition image data or high definition image data;
   a plurality of orthogonal transform units arranged to perform an orthogonal-transform for the image data input by the input unit, wherein the plurality of the orthogonal transform units perform the orthogonal-transform corresponding to each of different block sizes;
   a block size determination unit arranged to determine a block size of the image data input by the input unit according to an output of the image size determination unit;
   a block construction unit arranged to divide the image data input by the input unit into blocks in accordance with the block size determined by the block size determination unit, select one of the plurality of orthogonal transform units in accordance with the block size determined by the block size determination unit, and supply image data divided into the blocks to the selected orthogonal transform unit;
   a quantization unit arranged to quantize the image data transformed by the orthogonal transform unit selected by the block construction unit;
   a coding unit arranged to encode the image data quantized by the quantization unit;
   an inverse orthogonal transform unit arranged to perform an inverse orthogonal transform to output data from the selected orthogonal transform unit, using the same block size as determined by the block size determination unit; and
   a deblocking filter arranged to perform a filtering process to block boundaries of output data from the inverse-orthogonal-transform unit, in accordance with the block size determined by the block size determination unit.

22. An image coding apparatus according to claim 21, wherein the block construction unit selects the orthogonal transform for a 4 ×4 pixel unit if the image data input by the input unit is standard definition image data, and selects the orthogonal transform for an 8×8 pixel unit if the image data input by the input unit is high definition image data.

23. An image coding method for an image coding apparatus to perform a coding process, the image coding method comprising steps of:
   a mode selection step of selecting a definition type of an input image;
   an input step of inputting image data in accordance with an output in the mode selection step;
   an image size determination step of determining an image size of the image data input in the input step in accordance with the output of the mode selection step;

an orthogonal transform step of performing an orthogonal-transform for the image data input in the input step, wherein a plurality of orthogonal transform units perform the orthogonal transform corresponding to each of different block sizes;

a block size determination step of determining a block size of the image data input in the input step in accordance with the image size determined in the image size determination step; and a block construction step, performed by a block construction unit of the image coding apparatus, of dividing the image data input in the input step into blocks of the block size determined in the block size determination step, of selecting one of the plurality of orthogonal transform units in accordance with the block size determined in the block size determination step, and of supplying image data divided into the blocks to the selected orthogonal transform unit in the orthogonal transform step.

24. A computer-readable medium storing program code for performing the image coding method according to claim 23.

25. An image coding method for an image coding apparatus to perform a coding process, the image coding method comprising steps of:

an input step of inputting image data;

an image size determination step of determining an image size of the image data input in the input step;

an orthogonal transform step of performing an orthogonal-transform for the image data input in the input step, wherein a plurality of orthogonal transform units perform the orthogonal transform corresponding to each of different block sizes;

a block size determination step of determining a block size of the image data input in the input step in accordance with the image size determined in the image size determination step;

a block construction step, performed by a block construction unit of the image coding apparatus, of dividing the image data input in the input step into blocks of the block size determined in the block size determination step, of selecting one of the plurality of orthogonal transform units in accordance with the block size determined in the block size determination step, and of supplying image data divided into the blocks to the orthogonal transform step;

an inverse orthogonal transform step of performing an inverse orthogonal transform to output data from the selected orthogonal transform unit, using the same block size as determined by the block size determination step; and a filter step of performing a filtering process to output data from the inverse-orthogonal-transform step, in accordance with the block size determined by the block size determination step.

26. A computer-readable medium storing program code for performing the image coding method according to claim 25.

27. An image coding method for an image coding apparatus to perform a coding process, the image coding method comprising steps of:

an input step of selectively inputting standard definition image data and high definition image data;

an image size determination step of determining whether the image data input in the input step is standard definition image data or high definition image data;

an orthogonal transform step arranged to perform an orthogonal-transform for the image data input in the input step, wherein a plurality of orthogonal transform units perform the orthogonal transform corresponding to each of different block sizes;

a block size determination step of determining a block size of the image data input in the input step according to a result in the image size determination step;

a block construction step, performed by a block construction unit of the image coding apparatus, of dividing the image data input in the input step into blocks in accordance with the block size determined in the block size determination step, of selecting one of the plurality of orthogonal transform units in accordance with the block size determined in the block size determination step, and of supplying image data divided into the blocks to the orthogonal transform step;

a quantization step of quantizing the image data transformed in the orthogonal transform step selected in the block construction step;

a coding step of encoding the image data quantized in the quantization step;

an inverse orthogonal transform step of performing an inverse orthogonal transform to output data from the selected orthogonal transform unit, using the same block size as determined by the block size determination step; and a deblocking filter step of performing a filtering process to block boundaries of output image data from the inverse-orthogonal-transform step, in accordance with the block size determined by the block size determination step.

28. A computer-readable medium storing program code for performing the image coding method according to claim 27.

* * * * *